United States Patent Office 3,759,872
Patented Sept. 18, 1973

3,759,872
PROCESS FOR THE PRODUCTION OF EPOXIDE POLYADDUCTS WITH PHOSPHINE OXIDE ACCELERATORS
Joachim Lorenz, Bensheim-Auerbach, Germany, assignor to Ciba-Geigy Marienberg GmbH, Lautern, Odenwald, Germany
No Drawing. Filed Feb. 1, 1972, Ser. No. 222,695
Claims priority, application Germany, Feb. 3, 1971,
P 21 04 910.5
Int. Cl. C08g 30/14
U.S. Cl. 260—47 EC                          1 Claim

ABSTRACT OF THE DISCLOSURE

Process for the production of epoxide polyadducts by the reaction of epoxide compounds with compounds giving polyadducts of epoxide compounds, whereby the reaction is carried out in the presence of a phosphine oxide as a reaction accelerator in an amount of 0.1 to 10 parts by weight to 100 parts by weight of the epoxide compound.

---

The invention relates to the production of polyadducts having a base of epoxide resins of the usual composition, such as are used for the production of shaped components, for the formation of coatings, as adhesives and as binders. Such epoxide resin systems usually contain, in addition to epoxide resin—or optionally mixtures of various epoxide resins—(by epoxide resin is meant, as is known, compounds having at least one epoxide group—cp. H. Lee and K. R. Neville "Handbook of Epoxy Resins," McGraw-Hill Book Co., 1967, pages 1–2), curing agents—or optionally mixtures of several curing agents—and, optionally, further additives, e.g. fillers, extenders, etc. The curing agents employed for cold curing at normal temperature are usually amines of various structures, polyaminoamides, melamine resins; or for hot curing: anhydrides of organic or inorganic acids, as well as phenol resins or isocyanates. The curing process is based on the reaction between the curing agent and the epoxide groups of the resin. The time required for curing depends particularly on the type of curing agent employed and on the curing conditions.

If the epoxide resin/curing agent mixture contains, as a further constituent, additives such as, e.g. certain types of tar, mineral substances, pigment dyestuffs, extenders, e.g. having a mineral-oil base, or if it is used for the production of coating substances with application of glass, mica, asbestos, or for the coating of paper, metals, etc., there occurs a retarding of the curing process compared with that in the case of the unfilled resin/curing agent system.

A number of additives have already been suggested which accelerate the curing both of the above mentioned filled and of the unfilled resin/curing agent systems, or which result in a lowering of the temperature required for curing. In the case of the reaction of acid anhydrides with epoxide resins containing no hydroxyl groups, especially with types such as bisphenol-A-diglycidyl ether, a curing to obtain usable products is, as a rule, only to any extent possible after certain curing accelerators have been added.

Of the products suggested for the acceleration of the reaction of anhydrides, summarised by Lee and Neville in the quoted reference, pages 12–13, practical use has been made, in particular, of teritary amines such as, e.g. tris-(dimethylaminomethyl)-phenol.

Already suggested phosphorus compounds having an accelerating effect are triphenylphosphite (British patent specification No. 880,302) and phosphines such as triphenylphosphine and tris-2-ethylhexylphosphine (U.S. patent specification No. 2,768,153), and diphosphites (German application P 18 17 110.3/44). All these accelerators have certain disadvantages. Tertiary amines frequently have such a high vapour pressure that they cannot be employed for curing in vacuo. Furthermore, a general disadvantage characteristic of the amines is that they become discoloured during storage and this results in discolouration of the cured component. The suggested phosphines have, with regard to curing with amine curing agents, no accelerating action. Triphenylphosphite can be considered as a base of which the action should, therefore, be similar to that of the tertiary amines. It is, however, shown that triphenylphosphite is not able to accelerate the reaction of bisphenol-A-diglycidyl ether with acid anhydrides such as phthalic acid anhydride or hexahydrophthalic acid anhydride. This product displays an accelerating action only with respect to amine curing agents; it has to be employed, however, in amounts which have a modifying effect on a number of properties of the polyadduct.

The last-mentioned aspect also applies in the case of diphosphites, since they are used in amounts of 5–20 parts by weight to 100 parts by weight of epoxide resin.

The object of the present invention was therefore to provide an accelerator which can be applied in such small amounts that the properties of the cured shaped-component are not affected, which is itself colourless and which, even during storage, does not become discoloured, and does not lead to discolourations during the curing process, which has a vapour pressure enabling it to be used also under the conditions associated with vacuum techniques, and which is able to accelerate both amine-cured and acid-anhydride-cured systems.

It has now been found that phosphine oxides of the general formula $R_3PO$ can be used as accelerators for the curing of epoxide resin systems. With regard to these products, it is not a question of bases, but of neutral chemical products, and the accelerating action was thus not to be expected. The compounds described by the formula are colourless, liquid or solid compounds which are readily soluble in epoxide resins, and do not lead to discolouration during the curing process.

The invention thus relates to a process for the production in shaped form of epoxide polyadducts, the said process comprising the reaction of epoxide compounds containing at least one epoxy group in the molecule with compounds giving polyadducts, in the presence of a reaction accelerator consisting of phosphine oxides of the general formula $R_3PO$ in an amount of 0.1 to 10 parts by weight to 100 parts by weight of epoxide compounds. In this formula, the R's can be identical or different; one of the radicals R can also be hydrogen. The identical or different radicals R can represent alkyl or aryl, whereby the alkyl radicals can be straight-chain or branched and can comprise 1–18 C-atoms; or they can be cyclic, whereby the substituent R can be cyclopentyl or cyclohexyl, this optionally being substituted with further alkyl radicals. Finally, R can represent aryl, namely phenyl; or it can represent phenyl substituted by a hydrocarbon. R can also be aralkyl, particularly benzyl and 2-phenylethyl.

These phosphine oxides are as a rule known. They can be prepared, for example, by application of one of the methods given in Houben-Weyl, Methoden der Organischen Chemie, vol. 12/1 (1963), pp. 135–165 and 193–198.

Examples of phosphine oxides to be employed according to the invention are: dimethylphosphine oxide, diethylphosphine oxide, diisopropylphosphine oxide, dibutylphosphine oxide, dihexylphosphine oxide, dioctylphosphine oxide, dioctadecylphosphine oxide, trimethylphosphine oxide, triethylphosphine oxide, tri-n-propylphosphine oxide, triisopropylphosphine oxide, tri-n-butylphosphine oxide, triisobutylphosphine oxide, tri-secondary-butylphosphine oxide, tris-2-ethyl-hexylphosphine oxide, trioctylphosphine oxide, trioctadecylphosphine oxide, butyldiphenylphosphine oxide, methylbutyloctylphosphine oxide, dimethyloctylphosphine oxide, triphenylphosphine oxide, tricyclohexylphosphine oxide, tribenzylphosphine oxide, benzyldimethylphosphine oxide, tri-2-phenylethylphosphine oxide, tricyclopentylphosphine oxide, dimethyllaurylphosphine oxide, tritolylphosphine oxide, tri-p-tert.butyl-phenylphosphine oxide.

The addition of the curing accelerators according to the present invention is made to the epoxide resin or to the curing agent, or to the mixture of the epoxide resin with the curing agent.

The invention is further illustrated by the following examples; it is not, however, limited to these examples.

EXAMPLE 1

The curing time of a system curing at room temperature and consisting of 100 g. of epoxide resin (unmodifide liquid standard resin having a base of bisphenol-A with an epoxide equivalent weight of about 190) and 27.8 g. of a cycloaliphatic polyamine, H-active equivalent weight 52, as hardener is, without addition of a curing accelerator (control test), 91 minutes. With the below stated additions, the curing times are as follows:

2 g. of tributylphosphine oxide: 69 minutes,
5 g. of triisopropylphosphine oxide: 75 minutes,
5 g. of trioctylphosphine oxide: 73 minutes.

EXAMPLE 2

The curing time of a system curing at 150° C. and consisting of 50 g. of epoxide resin (unmodified liquid standard resin having a base of bisphenol-A with an epoxide equivalent weight of about 190 g.) and 39 g. of phthalic acid anhydride is, without addition of a curing accelerator (control test), 180 minutes. With the below stated additions, the curing times are as follows:

0.05 g. of trioctylphosphine oxide: 65 minutes,
0.25 g. of trioctylphosphine oxide: 45 minutes,
0.5 g. of trioctylphosphine oxide: 40 minutes,
1.0 g. of trioctylphosphine oxide: 29 minutes,
2.5 g. of trioctylphosphine oxide: 25 minutes,
5.0 g. of trioctylphosphine oxide: 23 minutes,
1.0 g. of triisopropylphosphine oxide: 40 minutes.

EXAMPLE 3

The curing time of a system curing at 150° C. and consisting of 50 g. of epoxide resin (unmodified liquid standard resin having a base of bisphenol-A with an epoxide equivalent weight of about 190 g.) and 40.5 g. of hexahydrophthalic acid anhydride is, without addition of a curing agent (control test), 6.5 hours. With the below stated additions, the curing times are as follows:

0.25 g. of trioctylphosphine oxide: 4 hours 30 minutes,
0.5 g. of trioctylphosphine oxide: 4 hours,
1.0 g. of trioctylphosphine oxide: 3 hours 25 minutes,
2.5 g. of trioctylphosphine oxide: 2 hours 50 minutes.

EXAMPLE 4

The curing time of a system curing at 120° C. and consisting of 50 g. of epoxide resin (cycloaliphatic diepoxide resin, epoxide equivalent weight 157) and 40 g. of phthalic acid anhydride is, without addition of a curing accelerator (control test), 1 hour. With the below stated additions, the curing times are as follows:

1.0 g. of trioctylphosphine oxide: 45 minutes,
2.5 g. of trioctylphosphine oxide: 23 minutes.

If 26 g. instead of 40 g. of phthalic acid anhydride are used, then the following curing times are obtained:

without addition: 65 minutes,
1.0 g. of trioctylphosphine oxide: 40 minutes,
2.5 g. of trioctylphosphine oxide: 23 minutes.

EXAMPLE 5

The curing time of a system curing at 150° C. and consisting of 50 g. of epoxide resin (unmodified liquid standard resin having a base of bisphenol-A with an epoxide equivalent weight of about 190 g.) and 39 g. of phthalic acid anhydride is, without addition of a curing accelerator (control test), 180 minutes. The curing times with the below stated additions are as follows:

0.25 g. of dimethylphosphine oxide: 48 minutes,
0.25 g. of octadecyldimethylphosphine oxide: 45 minutes,
0.25 g. of phenyldibutylphosphine oxide: 50 minutes,
0.25 g. of tricyclohexylphosphine oxide: 47 minutes.

I claim:
1. In the process for producing epoxide polyadducts in shaped form comprising reacting epoxide resins with compounds capable of producing polyadducts of epoxide resins and selected from the group consisting of amines and organic acid anhyldrides, in the presence of a reaction accelerator, the improvement wherein the reaction accelerator is selected from phosphine oxides in an amounts of 0.1 to 10 parts by weight to 100 parts by weight of the epoxide resins, said phosphine oxides being of the formula $R_3PO$ wherein the R's can be identical or different, and wherein R represents hydrogen or alkyl, whereby the alkyl radicals can be straight- or branched-chain containing 1–18 carbon atoms, or the alkyl can be cyclic selected from the group consisting of cyclopentyl, or cyclohexyl optionally substituted with further alkyl radicals or an aryl radical selected from phenyl or phenyl substituted by a hydrocarbon or an aralkyl selected from benzyl and 2-phenylethyl.

References Cited
UNITED STATES PATENTS 2,768,153 10/1956 Shokal _____ 260—2 X
3,547,881 12/1970 Mueller et al. _____ 260—47

HAROLD D. ANDERSON, Primary Examiner

T. E. PERTILLA, Assistant Examiner

U.S. Cl. X.R.
260—2 EC; 78.4 EP